(12) United States Patent
Faresse

(10) Patent No.: US 12,400,500 B2
(45) Date of Patent: Aug. 26, 2025

(54) ACCESS GATE

(71) Applicant: Dormakaba Schweiz AG, Rümlang (CH)

(72) Inventor: Marc Faresse, Châtonnaye (CH)

(73) Assignee: Dormakaba Schweiz AG, Rümlang (CH)

( * ) Notice: Subject to any disclaimer, the term of this patent is extended or adjusted under 35 U.S.C. 154(b) by 0 days.

(21) Appl. No.: 18/000,660

(22) PCT Filed: Jun. 1, 2021

(86) PCT No.: PCT/EP2021/064708
§ 371 (c)(1),
(2) Date: Dec. 2, 2022

(87) PCT Pub. No.: WO2021/245098
PCT Pub. Date: Dec. 9, 2021

(65) Prior Publication Data
US 2023/0215234 A1 Jul. 6, 2023

(30) Foreign Application Priority Data

Jun. 3, 2020 (CH) ........................................ 658/20

(51) Int. Cl.
*G07C 9/15* (2020.01)
*G06V 10/82* (2022.01)
(Continued)

(52) U.S. Cl.
CPC ............... *G07C 9/15* (2020.01); *G06V 10/82* (2022.01); *G06V 20/52* (2022.01); *G06V 40/10* (2022.01)

(58) Field of Classification Search
None
See application file for complete search history.

(56) References Cited

U.S. PATENT DOCUMENTS 5,555,512 A * 9/1996 Imai ..................... G08B 13/194
250/342
10,842,415 B1 * 11/2020 Jagannathan ........ A61B 5/7221
(Continued)

FOREIGN PATENT DOCUMENTS

| EP | 3627456 A1 | 3/2020 |
| GB | 2549782 A | 1/2017 |
| WO | WO 2019/232624 A1 | 12/2019 |

OTHER PUBLICATIONS

International Search Rerport and Written Opinion of the International Searching Authority for International Application No. PCT/EP2021/064708, mailed on Sep. 14, 2021, in 15 pages.
(Continued)

*Primary Examiner* — Fekadeselassie Girma
(74) *Attorney, Agent, or Firm* — Knobbe, Martens, Olson & Bear, LLP

(57) ABSTRACT

An access gate for controlling access of individuals passing through a passageway to an access controlled area comprises a cabinet, bordering the passageway, and a movable barrier, attached to the cabinet and configured to open or close access through the passageway. The access gate further comprises a detector having a detection zone directed to a ground of the passageway. Capturing measurement data of individuals approaching the movable barrier is thereby limited to lower body extremities, including feet of the individuals approaching the movable barrier. An electronic circuit is connected to the detector and configured to determine from the measurement data received from the detector information related to the feet of the individuals approaching the movable barrier, and to detect tailgating of the individuals passing through the passageway, using the feet information.

15 Claims, 3 Drawing Sheets

(51) Int. Cl.
  *G06V 20/52*     (2022.01)
  *G06V 40/10*     (2022.01)

(56)        References Cited

U.S. PATENT DOCUMENTS

| | | |
|---|---|---|
| 2007/0194917 A1 | 8/2007 | Girod et al. |
| 2018/0102005 A1 | 4/2018 | Esposito et al. |
| 2018/0285634 A1* | 10/2018 | Varadarajan ......... G06V 40/107 |
| 2020/0041688 A1* | 2/2020 | Huff ........................ G01S 17/42 |
| 2021/0064141 A1* | 3/2021 | Németh ................. G06N 3/045 |
| 2021/0312732 A1 | 10/2021 | Zeus et al. |
| 2021/0358250 A1* | 11/2021 | Venetianer ............... G07C 9/37 |
| 2024/0032822 A1* | 2/2024 | Wang ..................... A61B 5/112 |

OTHER PUBLICATIONS

Examination Report issued on Jun. 3, 2025, in corresponding Australian Application No. 2021283679.
Siegmund et al. "Piggybacking Detection Based on Coupled Body-Feet Recognition at Entrance Control", Springer Nature Switzerland AG 2019.

\* cited by examiner

ACCESS GATE

CROSS-REFERENCE TO RELATED APPLICATIONS

This application is the U.S. National Phase under 35 U.S.C. § 371 of International Application No. PCT/EP2021/064708, filed Jun. 1, 2021, titled ACCESS GATE, which claims priority to CH Patent Application No. 00658/20, filed Jun. 3, 2020, the entirety of each of which is hereby expressly incorporated by reference herein.

FIELD OF THE DISCLOSURE

The present disclosure relates to an access gate for controlling access of individuals to an access controlled area and for detecting tailgating.

BACKGROUND OF THE DISCLOSURE

Tailgating refers to a breach in physical security in which an unauthorized individual follows an authorized individual to enter an access controlled area. Typically, individuals can enter the access controlled area via one or more access gates, which allow passing of single individuals, usually upon validation of access information. In the case of tailgating the unauthorized individual follows the authorized individual in a relatively close distance through the access gate.

Current solutions to detect tailgating at access gates either involve inaccurate or complex 3D imaging techniques. In addition, current approaches often have privacy issues, as personal data, such as visual data of the persons passing the access gates are collected as a byproduct in order to detect tailgating. A further challenge is the avoidance of false alerts in case an individual carries an object e.g. luggage when passing through the access gate, such that the object is not confused with an unauthorized individual tailgating the authorized individual through the access gate.

Some attempts have been made to address the mentioned challenges, which are shortly described hereinafter.

WO2003088157A1 published in October 2003 in the name of Bramblet John Westley, Laforge Seth Michael, Witty Carl Roger and Newton Security Inc. relates to methods of detecting tailgating using machine vision methods, wherein camera images of the controlled area are processed to identify and track objects in the controlled area. This processing includes 3D surface analysis to distinguish and classify objects in the field of view.

EP3203447B1 published in February 2016 in the name of Holding Assessoria I Lideratge SL., relates to a method for detecting tailgating of subjects and/or objects at gates, comprising: measuring the occultation of at least one reference occulted by at least one subject and/or at least one object passing through at least one gate, generating at least one time series based on the measured occultation and determining at least one parameter from the at least one generated time series for characterization of the at least one subject and/or at least one object passing through at least one gate.

WO2017136160A1 published in August 2017 in the name of Sensormatic Electronics, LLC., relates to a security system comprising a positioning unit that determines locations of user devices relative to a threshold of the access point, a surveillance camera that monitors the threshold, and an access control system that controls the access point based on the locations of the user devices and orientations of individuals carrying the user devices relative to the access point. The surveillance camera is used to prevent tailgating. The camera's image data is also analyzed to determine the orientation of the individuals relative to the access point, such as a door. If the individuals are oriented such that they may be merely walking past the door, then access is not granted.

SUMMARY OF THE DISCLOSURE

It is an object of this disclosure to provide an access gate for controlling access of individuals to an access controlled area. In particular, it is an object of the present disclosure to provide an access gate for controlling access of individuals to an access controlled area and for detecting tailgating, which access gate does not have at least some of the disadvantages of the prior art.

According to the present disclosure, these objects are achieved through the features of the independent claims. In addition, further advantageous embodiments follow from the dependent claims and the description.

An access gate for controlling access of individuals passing on a ground of a passageway to an access controlled area comprises a cabinet, bordering the passageway, and a movable barrier, attached to the cabinet and configured to open or close access through the passageway.

According to the present disclosure, the above-mentioned objects are particularly achieved in that the access gate further comprises at least one detector having a detection zone covering at least partially the ground of the passageway, which is set up to limit capturing of measurement data of individuals approaching the movable barrier in the passageway to lower body extremities. The lower body extremities include the feet of the individuals approaching the movable barrier.

In general, the detection zone refers to the extent of the observable world of which the detector is capable to gather measurement data from. In the case of optical sensors or cameras the detection zone is typically defined by a solid angle through which the detector is sensitive to electromagnetic radiation, this is also known as the field of view. When for example the detection zone is cone-shaped, the detector gathers measurement data only within the cone-shaped detection zone and the detection zone can be directed to an area of observation e.g. the ground.

The access gate further comprises an electronic circuit connected to the at least one detector and configured to determine from the measurement data received from the at least one detector feet information related to the feet of the individuals approaching the movable barrier, and to detect tailgating of the individuals passing through the passageway, using the feet information.

This access gate does not capture any personal data of the individuals passing through the passageway as a byproduct in the detection of tailgating. In particular no facial features of the individuals passing through the access gate are captured or stored.

In an embodiment, the cabinet is formed as a frame to support the thereto attached movable barrier. In some variations opposing the cabinet a second cabinet is arranged bordering the passageway.

Depending on the embodiment, the detector comprises a radio frequency antenna array, a 2D- or 3D-prolife laser sensor, lidar, an infrared sensor, and/or a camera. Accordingly, the measurement data comprises spatial depth information, 2D or 3D depth information, a single image, and/or a stream of images.

In an embodiment, the detector comprises an optical sensor having an optical axis directed to the ground of the passageway, such as to limit capturing of visual data, of individuals approaching the movable barrier in the passageway to lower body extremities, including feet of the individuals approaching the movable barrier. In other words, the field of view of the optical sensor is directed to the ground of the passageway.

In an embodiment, the optical sensor comprises a camera, having an optical axis directed to the ground of the passageway, such as to limit capturing of visual data, of individuals approaching the movable barrier in the passageway to lower body extremities, including feet of the individuals approaching the movable barrier.

In an embodiment, the detector is attached to the cabinet.

In an embodiment, the detector is essentially arranged inside the cabinet. In comparison to for example a detector arranged at the ceiling above the access gate, the arrangement of the detector according to the disclosure reduces complexity in connecting the detector and the electronic circuit.

In an embodiment, the electronic circuit is arranged inside the cabinet.

In an embodiment, in the case of multiple access gates, controlling the access of individuals to the access controlled area a common electronic circuit is connected to the detectors of multiple access gates.

In an embodiment, the electronic circuit usually comprises at least one processor and a memory to at least temporarily store the measurement data received from the detector.

In an embodiment, the electronic circuit further comprises a communication unit configured to receive measurement data from the detector. Depending on the embodiment, the at least one detector is connected to the electronic circuit by a wireless or wired communication network.

In an embodiment, the electronic circuit is further configured to store a trained neural network and to apply the trained neural network to the measurement data received from the at least one detector for determining the feet information related to the feet of the individuals. This allows a determination of the feet information and the detection of tailgating of the individuals passing through the passageway by the access gate as a stand-alone device. Sending the measurement data from the detector via a communication network to remote computer system is not required and the inherent security risks of the communication network is avoided.

In an embodiment, the electronic circuit is further configured to determine from the feet information the number of individuals approaching the movable barrier in the passageway in a definable time interval and to evaluate whether the determined number is above a definable value. A typical time interval would be the time between the movable barrier opening, to let an individual pass, and the movable barrier closing, after the individual passed the access gate. Typically the value for the upper limit of individuals per time internal is defined to be one individual, as the access gate is typically configured to allow the passing of single individuals, however the value can be adjusted depending on the embodiment or the circumstances.

In an embodiment, the electronic circuit is further configured to determine from the visual data received from the at least one optical sensor object information of an object moving towards the movable barrier in the passageway, and to detect the tailgating of the individuals passing through the passageway using the object information. This way, the access gate avoids false detection of tailgating when an individual carrying an object passes through the passageway of the access gate. For example, a trolly bag carried by a first individual, approaching the movable barrier, is thereby advantageously not determined to be a second individual, following in relatively close distance to the first individual, but as an object.

In an embodiment, the electronic circuit is further configured to determine from the visual data, received from the at least one optical sensor, one or more of the following parameters of an object moving towards the movable barrier in the passageway: size, orientation, spatial proportions, speed and/or direction of movement, and to control the movable barrier using the one or more determined parameters. An advantage is the reduced possibility of jamming of the movable barrier by the object, since the electronic circuit controls the movable barrier to close after the passing of the individual and the object.

In an embodiment, the electronic circuit is further configured to receive access information from an individual located in the passageway, and to determine from the visual data received from the at least one optical sensor size information and/or spatial proportions information of an object accompanying the individual, and to transmit the size information and/or spatial proportions information, and the access information to a computer system via a communication network. This makes it possible for the computer system to compare the received size information and/or spatial proportions information, and the access information to reference information, such as size limitations.

Depending on the embodiment, the access gate comprises one or more close range reading interfaces, such as an optical reader, a QR-code reader, a NFC reader and/or a Bluetooth reader connected to the electronic circuit, in order to receive access information.

Depending on the embodiment, the access gate is configured for bi-directional passing of individuals through the passageway of the access gate, approaching the movable barrier from different ends of the passageway. In an embodiment, the access gate comprises at least one optical sensor having an optical axis directed to one of the ends of the passageway and at least one optical sensor having an optical axis directed to the other end of the passageway.

In an embodiment, the access gate is configured to activate the capturing of visual data by at least one activated optical sensor, upon individuals approaching the movable barrier, whereby the optical axis of the at least one activated optical sensor is directed to the end of the passageway from which the individuals are approaching the movable barrier.

Preferably the at least one optical sensor is arranged at a height lower than 1.2 meters or at a height lower than 0.8 meters measured from the ground of the passageway. This allows for a simple construction and ensures the capturing of visual data of individuals approaching the movable barrier in the passageway is limited to the lower body extremities of the individuals. Furthermore, the quality and resolution of the visual data is increased when the optical sensor is arranged as described before.

Depending on the height at which the optical sensor is arranged, an angle between the optical axis and the ground can be adjusted. In case of the optical sensor being arranged at a small height from the ground e.g. at around 20 cm the optical axis can be essentially parallel to the ground of the passageway.

In some embodiments, two or more optical sensors are arranged, such that they capture the passageway from at least two points of view. In an embodiment a first optical sensor is arranged at a first distance from the movable barrier and a second optical sensor is arranged at a second distance from the movable barrier. In case the first distance and the second distance are equal, the first and the second optical sensor are arranged symmetrically with respect to a passing direction. The first and the second optical sensor can be arranged on one or both sides of the passageway. In case the optical sensors are arranged on one side of the passageway, the first distance is smaller than the second distance, such that the first optical sensor is arranged closer to the movable barrier than the second optical sensor. Although the optical axes are directed to the ground of the passageway, the optical sensors capture visual data from different points of view.

In an embodiment, the electronic circuit is further configured to control opening and closing of the movable barrier, such that upon detection of tailgating the access to the access controlled area is closed. The security of the access controlled area is thereby increased.

In an embodiment, the electronic circuit is integrally formed with the at least one optical sensor and/or arranged in the cabinet of the access gate.

BRIEF DESCRIPTION OF THE DRAWINGS

The herein described disclosure will be more fully understood from the detailed description given herein below and the accompanying drawings which should not be considered limiting to the disclosure described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
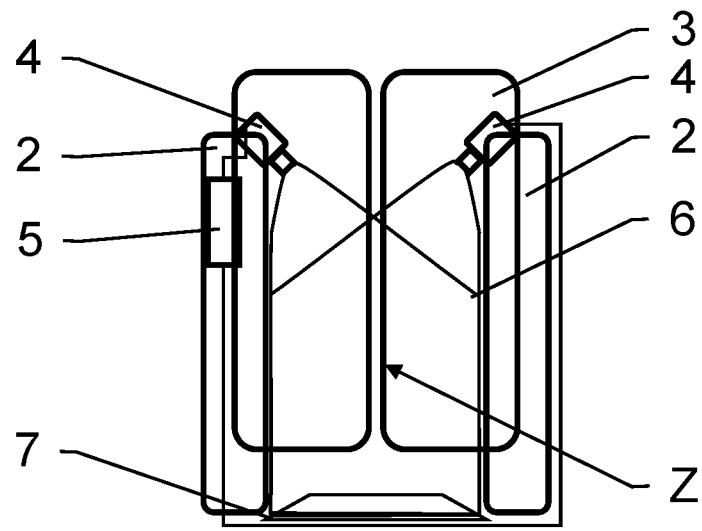
FIG. 1 a first embodiment of an access gate according to the disclosure.
Figure 2:
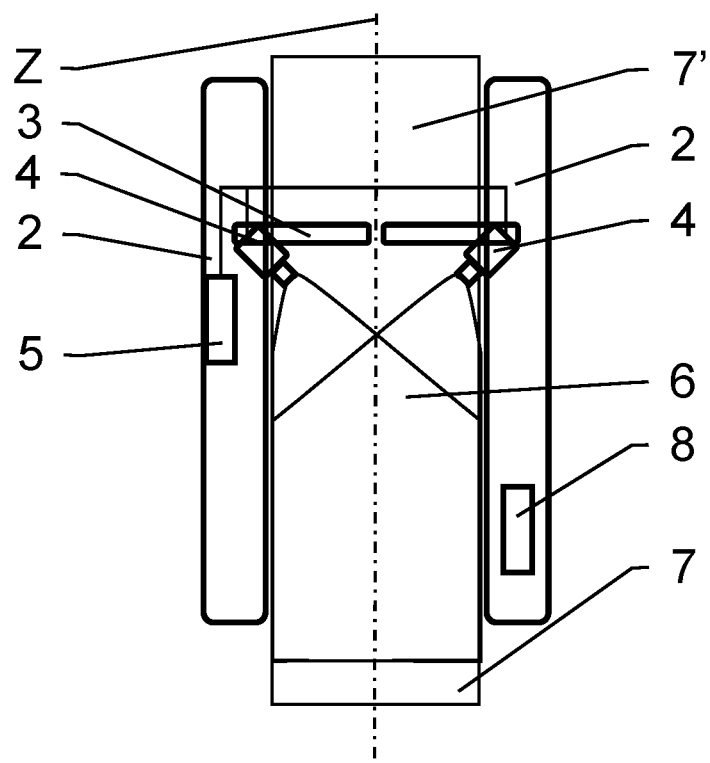
FIG. 2 a top down view of the first embodiment of an access gate.

FIG. 1 shows a first embodiment of an access gate 1, which is shown in a top down view in FIG. 2. FIGS. 3 to 6 show embodiments of an access gate 1 in a top down view.

The embodiments of the access gate 1 shown in FIGS. 1 to 6 are used to control access of individuals passing on a ground of a passageway 7 in a passage direction Z to an access controlled area. The access gate 1 comprises a cabinet 2 arranged next to the passageway 7. A movable barrier 3 configured to open or close access through the passageway 7 is attached to the cabinet 2. In the shown embodiments the access gate 1 comprises two cabinets 2 arranged opposing each other and bordering the passageway 7.

As can be seen in FIG. 1, the access gate 1 further comprises at least one detector 4 having a detection zone 6 directed to the ground of the passageway 7, such as to limit capturing of measurement data of individuals approaching the movable barrier 3 in the passageway 7 to lower body extremities, including feet of the individuals approaching the movable barrier 3. In the embodiment shown the access gate comprises two detectors 4, formed as two cameras 4 each having an optical axis directed to the ground of the passageway 7, such as to limit capturing of visual data of individuals approaching the movable barrier 3 in the passageway 7 to lower body extremities. The cameras 4 are each attached to one of the cabinets 2 of the access gate 1 at a height of about 70 cm or 50 cm or 30 cm measured from the ground of the passageway.

The access gate 1 further comprises an electronic circuit 5 connected to the cameras 4, as illustrated in FIG. 2. The electronic circuit 5 is configured to receive visual data from the cameras 4 to determine from the visual data feet information related to the feet of the individuals approaching the movable barrier 3, and to detect tailgating of the individuals passing through the passageway 7, using the feet information. In order to determine the feet information related to the feet of the individuals the electronic circuit 5 is further configured to store a trained neural network and to apply the trained neural network to the visual data received from the cameras 4.

The electronic circuit 5 is further configured to determine from the feet information the number of individuals approaching the movable barrier 3 in a predefined time interval. This allows the electronic circuit 5 to determine, if there is a tailgating situation. In order to do so, the electronic circuit 5 is further configured to evaluate whether the determined number of individuals is above a predefined value. In case a tailgating situation is detected by the electronic circuit 5, it is configured to close the movable barrier 3 and thereby the access to the access controlled area.

To reduce the chance of jamming of the movable barrier 3 by an object carried by an individual, the electronic circuit 5 is further configured to determine from the visual data received from the cameras 4 the size of the object moving towards the movable barrier in the passageway. The electronic circuit 5 then controls the barrier 3 to let the individual and the object to pass the barrier 3, without closing the barrier 3, while the object or the individual is passing through.

The access gate 1, as displayed in FIG. 2, further comprises a close range reading interface 8, which is configured to read access information. In the shown embodiment, the close range reading interface 8 is a QR-code reader 8. The electronic circuit 5 is further configured to receive access information from an individual located in the passageway via the close range reading interface 8, and to determine from the visual data received from the cameras 4 the size of the object accompanying the individual.

The electronic circuit 5 is in the first embodiment of the access gate 1, as shown in FIGS. 1 and 2, arranged in the cabinet 2 and the cameras 4 are wire connected to the electronic circuit 5.

Figure 3:
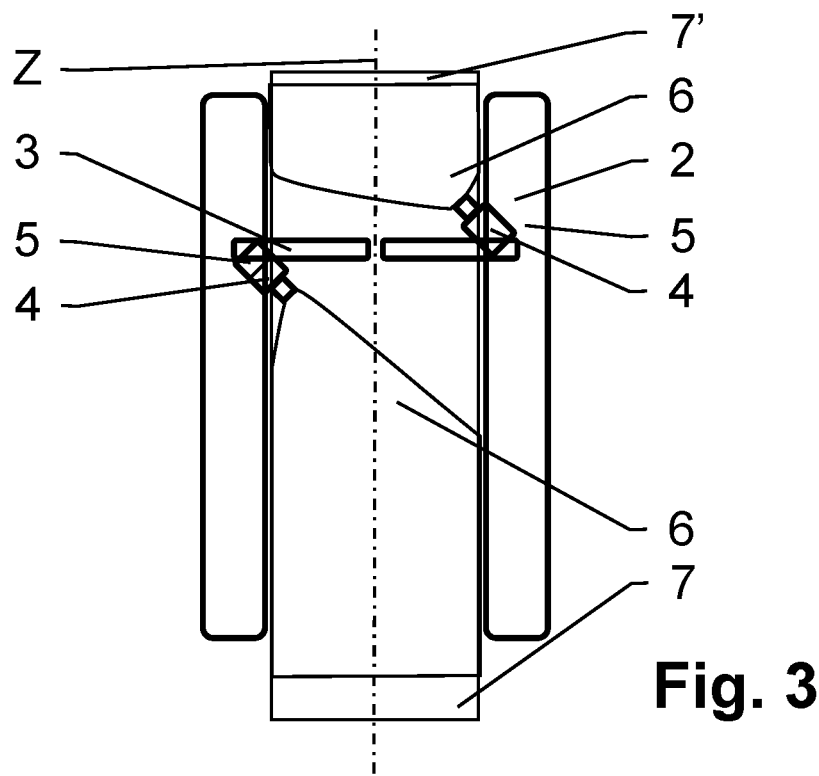
FIG. 3 a top down view of a second embodiment of an access gate.

FIG. 3 shows an embodiment of the access gate 1 which is configured for bidirectional passing of individuals through the passageway 7. In order to determine tailgating of individuals approaching the movable barrier 3 from both ends of the passageway 7, 7', the access gate 1 comprises a camera 4 having an optical axis directed to one of the ends of the passageway 7 and a camera 4 having an optical axis directed to the other end of the passageway 7'.

Figure 4:
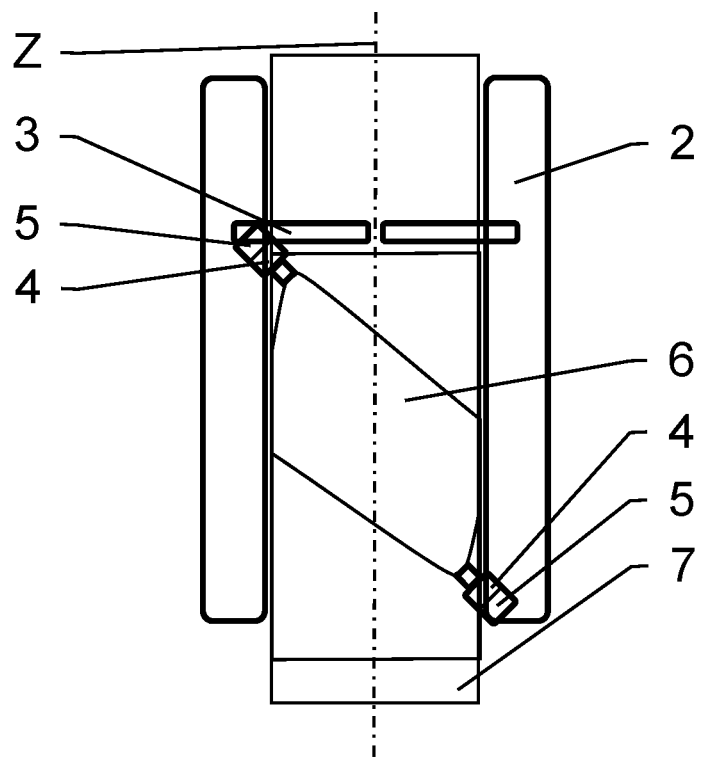
FIG. 4 a top down view of a third embodiment of an access gate.

In FIG. 4, an embodiment of an access gate 1 is shown, which comprises two cameras 4 arranged at different distances from the movable barrier 3 in the passage direction Z. Both cameras 4 are directed to the same area on the ground of the passageway 7 from different points of view.

Figure 5:
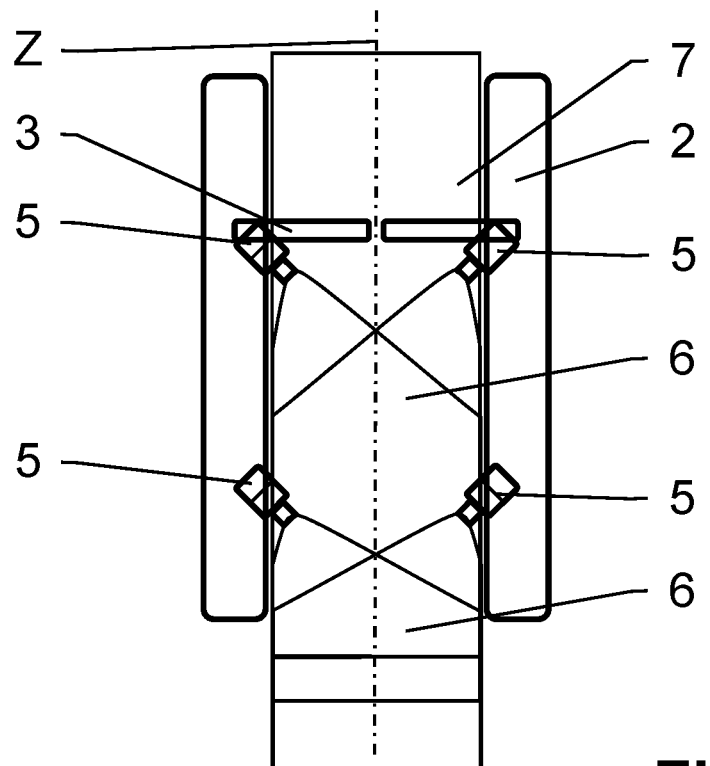
FIG. 5 a top down view of a fourth embodiment of an access gate.
Figure 6:
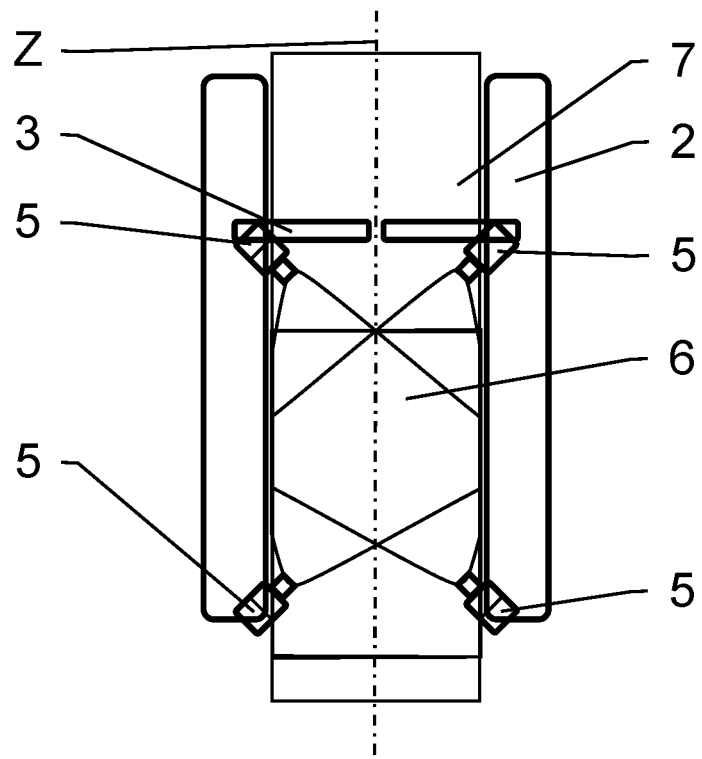
FIG. 6 a top down view of a sixth embodiment of an access gate.

FIGS. 5 and 6 both show an embodiment of the access gate 1 comprising four cameras 4, wherein each camera 4 is arranged on the same side of the movable barrier 3. Two pairs of two cameras 4 are arranged symmetrically with respect to the passing direction Z. In FIG. 5, each pair of cameras 4 has a common field of view 6, whereas in FIG. 6 all four cameras 4 have a common field of view, but again from a different point of view. Having a common field of view reduces the likelihood of errors by the electronic circuit 5 determining the feet information from the visual data from the cameras 4, due to occultation of legs or objects from a single point of view.

LIST OF REFERENCE NUMERALS

1 Access gate
2 Cabinet
3 Barrier
4 Detector (camera)
5 Electronic circuit
6 Detection rage (field of view)
7 Passageway
8 Close range reading interface
Z Passing direction

What is claimed is:

1. An access gate for controlling access of individuals passing on a ground of a passageway to an access controlled area, the access gate comprising a cabinet, bordering the passageway, and a movable barrier, attached to the cabinet and configured to open or close access through the passageway, wherein the access gate further comprises:
   at least one detector having a detection zone covering at least partially the ground of the passageway, wherein the at least one detector comprises at least one optical sensor having an optical axis directed to the ground of the passageway such as to limit capturing of visual data of individuals approaching the movable barrier in the passageway to lower body extremities, including feet of the individuals approaching the movable barrier;
   an electronic circuit being connected to the at least one detector and configured to store a trained neural network and configured to apply the trained neural network to determine, from the measurement data received from the at least one detector, feet information related to the feet of the individuals approaching the movable barrier, and to apply the trained neural network to detect tailgating of the individuals passing through the passageway, using the feet information.

2. The access gate according to claim 1, wherein the at least one optical sensor comprises a camera, having an optical axis directed to the ground of the passageway, such as to limit capturing of visual data, of individuals approaching the movable barrier in the passageway to lower body extremities, including feet of the individuals approaching the movable barrier.

3. The access gate according to claim 1, wherein the at least one detector is attached to the cabinet.

4. The access gate according to claim 1, wherein the electronic circuit is further configured to determine from the feet information a number of individuals approaching the movable barrier in the passageway in a definable time interval and to evaluate whether the determined number is above a definable value.

5. The access gate according to claim 1, wherein the electronic circuit is further configured to determine, from the visual data received from the at least one optical sensor, object information of an object moving towards the movable barrier in the passageway, and to detect the tailgating of the individuals passing through the passageway using the object information.

6. The access gate according to claim 1, wherein the electronic circuit is further configured to determine, from the visual data received from the at least one optical sensor of an object moving towards the movable barrier in the passageway, at least one of the following parameters: size, orientation, spatial proportions, speed or direction of movement, and to control the movable barrier using the at least one determined parameter.

7. The access gate according to claim 1, wherein the electronic circuit is further configured to receive access information from an individual located in the passageway, and to determine, from the visual data received from the at least one optical sensor, size information and/or spatial proportions information of an object accompanying the individual, and to transmit the size information and/or spatial proportions information, and the access information to a computer system via a communication network.

8. The access gate according to claim 1, wherein the access gate is configured for bi-directional passing of individuals through the passageway of the access gate, approaching the movable barrier from different ends of the passageway, and the access gate comprises at least one optical sensor having an optical axis directed to one of the ends of the passageway and at least one optical sensor having an optical axis directed to the other end of the passageway.

9. The access gate according to claim 8, wherein the access gate is configured to activate the capturing of visual data by at least one activated optical sensor, upon individuals approaching the movable barrier, wherein the optical axis of the at least one activated optical sensor is directed to the end of the passageway from which the individuals are approaching the movable barrier.

10. The access gate according to claim 1, wherein the at least one optical sensor is arranged at a height lower than 1.2 meters or at a height lower than 0.8 meters.

11. The access gate according to claim 1, wherein two or more optical sensors are arranged symmetrically with respect to a passing direction, such that they capture the passageway from at least two points of view.

12. The access gate according to claim 1, wherein the electronic circuit is further configured to control opening and closing of the movable barrier, such that upon detection of tailgating the access to the access controlled area is closed.

13. The access gate according to claim 1, wherein the at least one optical sensor is connected to the electronic circuit by a wireless or wired communication network.

14. The access gate according to claim 1, wherein the at least one optical sensor is attached to the cabinet of the access gate.

15. The access gate according to claim 1, wherein the electronic circuit is integrally formed with the at least one optical sensor and/or arranged in the cabinet of the access gate.

* * * * *